Figure 1:
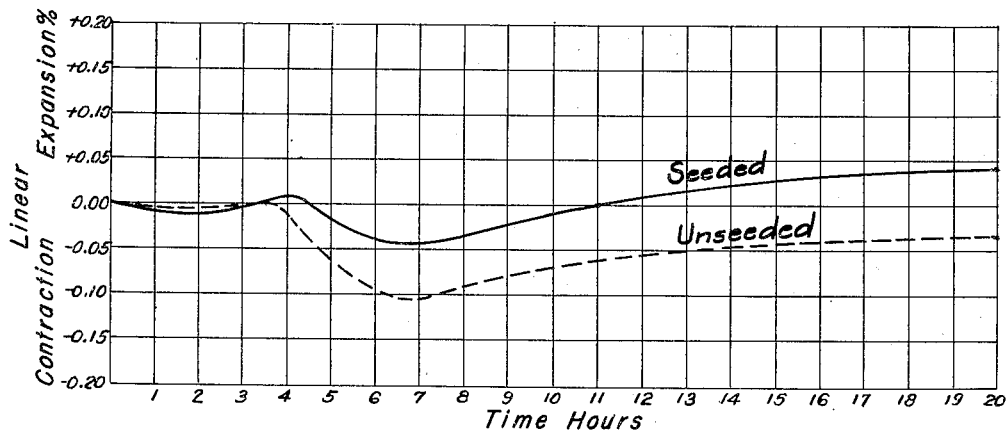

INVENTOR.
ALVA C. BYRNS

Patented Apr. 3, 1951

UNITED STATES PATENT OFFICE 2,546,971

CEMENT COMPOSITION AND METHOD OF MAKING

Alva C. Byrns, Concord, Calif., assignor to Kaiser Aluminum & Chemical Corporation, a corporation of Delaware Application April 20, 1949, Serial No. 88,516

19 Claims. (Cl. 106—106)

This invention relates to a process of making a Sorel cement composition; and more particularly it relates to a process whereby the volume stability of Sorel cements is improved.

It has long been known that cement compositions, known as Sorel cements, are obtained by treating with a gauging solution an active oxide of magnesium and that the compositions so obtained have valuable industrial properties. The magnesium oxide, or magnesia, useful in making such cements is produced by firing a compound of magnesium, which under such conditions yields magnesia, at temperatures and for periods of time which minimize sintering. A type of magnesia which is very desirable for this purpose is that having caustic burn.

Since most Sorel cements are employed in light colors and tints, the magnesia is desirably light in color. This requirement has necessitated a relatively pure raw material and has usually been met by selective mining of high grade magnesite and brucite. Such selective mining is expensive and, furthermore, the supply of high grade materials is rapidly decreasing. Magnesia obtained from sea water in the ways well-known to the art is a particularly desirable material for Sorel cements, both as to purity and to color. Also, the source of supply is practically inexhaustible. Consequently, a number of investigators have explored ways of using such sea water magnesia in Sorel cement.

The employment of sea water magnesia in Sorel cement compositions has exhibited the disadvantage that, whereas tensile and cross-bending strengths of the cement are satisfactory, there is marked volume instability. In other words, the cement exhibits undue shrinkage and, while it is only a small actual percentage of the entire area of the body, in applications such as floors and the like this shrinkage tends to cause large cracks and even pulling away from side edges. Proposed processes for overcoming these disadvantageous results have included adding materials which incidentally impart color to the composition, which is not always desirable, and blending magnesias to obtain the desired volume stability.

According to the present invention, the volume stability is improved and the shrinkage during setting reduced to a satisfactory extent by incorporating in the Sorel cement starting composition or in a component thereof, a small amount of pre-formed Sorel cement. The pre-formed material is preferably added in an amount of from about 0.5% to about 5.0% by weight, based on the total weight of dry mix. The pre-formed Sorel cement is considered as a seeding component and is added in finely divided form. It can be mixed with the magnesia component to be employed in making the Sorel cement; or it can be mixed with the silica component to be employed therein; or it can be mixed into the composition simultaneously with the other components. The term "dry mix" or "dry ingredients" or "the total amount of dry ingredients" is intended to mean the total dry ingredients employed in preparing a Sorel cement, exclusive of the gauging or setting solution, because the setting solution is admixed, usually, by the buyer and at the site of use. The magnesium chloride or sulfate is considered as an ingredient of the gauging solution.

The pre-formed, or seeding, material can be prepared by mixing an active magnesia and a gauging solution and permitting the material to set or harden. The magnesia can be obtained by calcining any magnesium compound, which upon calcining yields magnesium oxide, to an active state; and suitably the starting compound is magnesium hydroxide, magnesium carbonate or basic carbonate, magnesite, brucite or the like. The gaging solution is suitably a water solution of magnesium chloride, or a water solution of magnesium sulfate, or a solution of a mixture of magnesium chloride and magnesium sulfate. Advantageously, a 20%, by weight, solution in water is employed. When the gaging solution contains a mixture of magnesium chloride and magnesium sulfate, the latter salt is advantageously present in an amount of about 10% of the total salt content. The hardened seeding material prepared in this manner is finely comminuted and can then be admixed in the cement composition. The gaging solution is added in tempering amounts, according to ordinary good practice well-known in this art.

It is sometimes advantageous to prepare the seeding material by admixing with the magnesia and gaging solution an amount of any desired inert aggregate. Finely divided silica is a cheap, plentiful, and useful aggregate for such admixture. Up to 90% of silica can be added, the amount of magnesia correspondingly decreasing to about 10% thereof. It is believed that the magnesium oxychloride or oxysulfate forms around the silica particles, coating them and providing a greatly increased oxysalt seeding surface for the Sorel cement composition to be made. This is believed evidenced by the observations that, within the limits above stated, the maximum desired effect is obtained with a lesser addition of seed, as compared with that obtained when adding seed containing no silica. For instance, in a Sorel cement mix it has been observed that optimum control of contraction has been obtained, when adding the seeding oxysalt alone, with no aggregate, when there is added 3.0% of magnesium oxychloride seeding cement, containing no aggregate and ground to substantially pass 100 mesh; while the optimum control has been obtained, when adding the seed as the oxysalt in combination with aggregate, when there is added only 1.25% of magnesium oxychloride seeding cement prepared from a mixture of 12.5% of magnesia and 87.5% of silica and ground to substantially pass 100 mesh.

The process of this invention is of particular advantage in making Sorel cements wherein the magnesia component is sea water magnesia, that is, magnesia which has been obtained by calcining precipitated magnesium hydroxide or carbonate or basic carbonate, obtained by treating a magnesium salt solution, for example, bittern, brine or sea water in the known way. For example, sea water, brine, or bittern is treated with an alkali such as an alkali metal hydroxide, e. g. NaOH, or with lime or calcined dolomite which can be added in the dry, hydrated or slurry form, and there is precipitated magnesium hydroxide which is then preferably dewatered, washed, filtered and calcined in the known way. In another operation, the magnesium salt solution or the hydroxide sludge is treated with carbon dioxide to form therefrom a magnesium carbonate, usually the basic carbonate, and this compound is also suitably calcined to produce active magnesia useful in Sorel cement compositions. However, the seeding material of this invention is also useful in improving the setting and final characteristics of Sorel cements made from magnesia obtained by calcining the natural ores, such as magnesite and brucite, because Sorel cements from such magnesias often expand excessively upon setting with the production of a buckled effect, for instance, in a floor installation, and addition of the pre-formed Sorel cement in the making of such materials reduces such expansion. Mixtures of the described magnesium compounds can be calcined to obtain the desired active magnesia.

It is a particular advantage of the process and composition according to the present invention that the undesirable contraction which usually occurs during the setting or hardening of Sorel cements is overcome. It is also an advantage that a Sorel magnesia containing the seeding additive can be stored for long periods without deterioration. The cross-bending strengths of Sorel cements prepared with the addition of seeding material are not reduced, and a good initial hardness of such cement is obtained. It is believed probable that these and other advantageous effects result from the circumstance that the pre-formed seed material provides many nuclei of magnesium oxychloride or magnesium oxysulfate or the like, or mixtures thereof, upon which the mass of the Sorel cement can form. These nuclei are well dispersed throughout the mass and uniformly accelerate the otherwise slow approach to equilibrium which is so characteristic of basic systems.

The pre-formed Sorel composition, or seeding material, useful in this invention can be prepared by mixing an active magnesia with a gaging solution, for example, a water solution of magnesium chloride, magnesium sulfate or a mixture of the two, allowing to set or harden, and then crushing and milling to reduce it to a fine powder suitable for uniform dispersion in the cement mass to be made. The seeding material can also be made by mixing active magnesia and finely divided silica, the silica being added in an amount up to 90% by weight of the total weight of magnesia and silica, and then gaging with a solution as described above. Suitably, the magnesia and silica pass through a screen having 200 meshes to the linear inch. Rapid production of a uniform interdispersion is facilitated when from about 50% to about 90% of silica is added. Excellent results in practice have been observed with a seeding material prepared from a mixture of 12.5% magnesia and 87.5% silica, when added in an amount of 1.25% based on the total weight of dry ingredients in the cement composition. It is also observed in practice that seed mixes containing from about 50% to about 90% of silica are easier to comminute, for example, by grinding to the desired size for most effective dispersion in the cement batch. When adding seed mix prepared by gaging oxychloride grade magnesia without addition of silica, the best results are obtained when about 3% is added in the Sorel cement. It is advantageous to comminute the seeding material until substantially all passes, or is smaller than, 100 mesh.

The seeding material so prepared is preferably added in an amount of from about 0.5% to about 5.0% by weight based on the total weight of dry ingredients (that is, excluding the gaging solution). In making Sorel cement, employing this seeding material, the cement composition is prepared by admixing active magnesia, inert aggregate, for example, sand or silica, and admixing the seeding material therewith. Other additives, for example, talc, wood flour, coloring material or the like can also be added in the usual way, as is sometimes preferred in making flooring, for instance. In seeding a Sorel cement mix, the seeding material added is of the type of cement to be made. That is, if a magnesium oxychloride cement is being made a magnesium oxychloride seed is added; if the cement is to comprise oxychloride and a small proportion of oxysulfate cement, the seed can be oxychloride or it can comprise a mixture of oxychloride and oxysulfate in similar proportions.

It is an advantage of the present invention that the production of Sorel cement in practice proceeds in the manner well-known to the art, with the exception only that the seeding material is added. The seeding material is stable over long periods of storage. It can, therefore, be added either freshly made or after storage. It can be admixed with the magnesia, or the silica, or can be added separately in the batch. It is a further advantage that the color of the cement batch is not affected by the seeding material.

Figure 1 demonstrates some of the advantages obtained by the process and product of this invention. In this figure, the dotted line graph shows the linear change from the start, of a Sorel cement prepared by mixing 25% of an oxychloride grade magnesia, 40% of sand passing 30 mesh and retained on 60 mesh screen, 23% of silica flour passing 200 mesh, 1% of ground bark, 2% of talc, 3% of wood flour, and 6% of coloring oxides, gaging the mixture with magnesium chloride solution, and allowing to set or harden. The linear change is measured during the first 24 hours of setting, in all tests reported herein, according to the method given in Appendix G of "British Standard Specifications for Materials for Use in the Manufacture of Magnesium Oxychloride Flooring Compositions," No. 776 (1938). The solid line graph shows the corresponding linear change characteristics of a Sorel cement prepared from the same materials and in exactly the same way except that instead of 25% oxychloride grade magnesia only 23.5% thereof is added and there is also added 1.5% of a seed mix. The seed mix is prepared by mixing 25% oxychloride grade magnesia and 75% silica flour passing 200 mesh, gaging the mix so obtained in the ratio of 362 ml. of 20% $MgCl_2$ solution in water per 1000 gms. of the mix, and allowing to set and harden, then crushing and powdering in a hammer mill.

Figure 2:
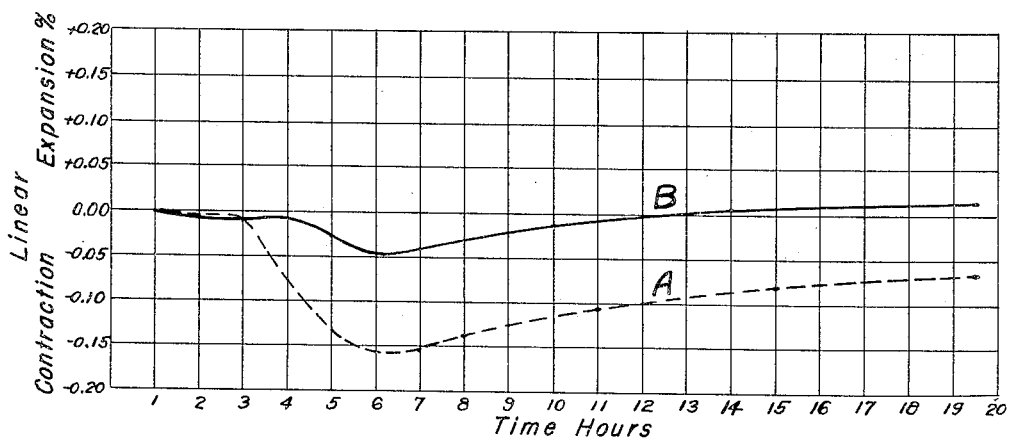
Figure 3:
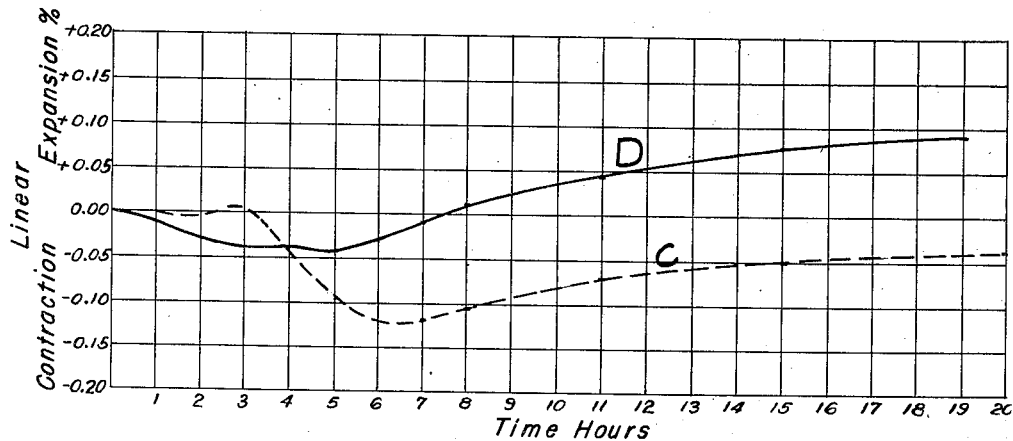
Figure 4:
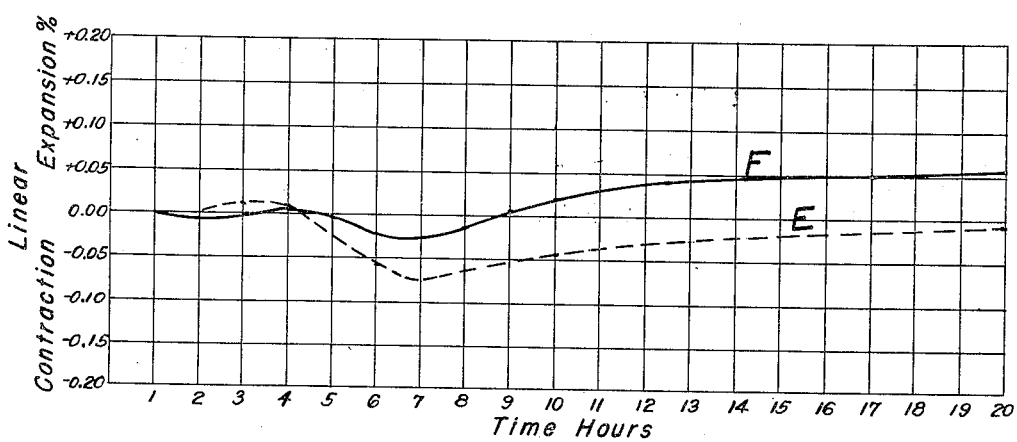

In hardening tests as shown in Figure 1, the exposed surface of the cement is quite well hardened at between 5 and 7 hours. This is the lowest point of the curve, and in the unseeded mix a considerable number of cracks appear at this stage. As shown in the graph, the cement never expands again to its original volume and the cracks therefore do not become completely closed up again. In industrial practice this situation is generally compensated for by working, or troweling, the mix again at this stage, while the portion beneath the surface is still unhardened, in order to close the cracks before final hardening or set. In other words, an extra operation is required with the unseeded material. With the seeded material, on the other hand, contraction is less and therefore tendency to crack is less, and after the contraction stage is passed, the cement expands sufficiently to at least resume its original volume and close the cracks. And at the same time, it does not expand excessively and, therefore, buckling tendencies are avoided. Figures 2, 3 and 4 graphically demonstrate the changes in volume occurring during hardening of the test batches described below; Figure 2, showing the difference in results with batches A and B; Figure 3, the results with batches C and D; and Figure 4, the results with batches E and F. In each of Figures 1, 2, 3, and 4, the linear change (in length), measured as described above, which corresponds to change in volume, is plotted against time; and each figure shows a flattening of the curve, in the "seeded" material, with regard to contraction. The lowest point of each curve, that is, the greatest contraction, occurs at what is called the "final set," where the surface becomes hard while the inner portion still has not completely hardened. By flattening this portion, that is, by reducing the contraction, cracking tendencies are reduced or avoided. Furthermore, the seeded cements in each case expand slightly by 20 hours, which would close any cracks that may have tended to form; while in every case, the unseeded cements failed to show this slight expansion.

A number of batches of Sorel cement are prepared as follows: Batch A is made by mixing 25.0% of a magnesia obtained by calcining magnesium hydroxide, derived from sea water by treatment thereof with calcined dolomite, to an iodine number of about 16.0, 40% of sand of 30 to 60 mesh size, 23% of silica flour passing 200 mesh, 1% bark, 2% talc, 3% wood flour and 6% coloring oxides, gaging the mix with 20% magnesium chloride solution and allowing to harden. Batch B is made in the same manner exactly, except that there are admixed, instead of 25% of the magnesia as in A, 23% of the same sea water magnesia and 2% of seed mix prepared by mixing 25% magnesia and 75% silica flour and gaging with the $MgCl_2$ solution. The minimum contraction of composition A is $-0.160\%$ and that of composition B, $-0.053\%$ (or only one-third as much as A). The total linear change of composition A is $-0.155\%$, and of composition B $-0.057\%$. The linear change of composition A from final set to 24 hrs. is $-0.006\%$, and of B, $-0.032\%$. The initial setting time for both A and B batches was 120 minutes, while final set for Batch A required 225 minutes and for B, 255 minutes. Figure 2 demonstrates the improvement in volume stability in the seeded mix.

In another set of comparative tests, batch C is prepared by mixing 25% of a composite sea water magnesia having an iodine number of about 15.5, prepared by mixing in suitable proportions, a magnesia of low activity (about iodine number 4.0) and a magnesia of higher activity (between iodine number 15 and 22), both these magnesias being obtained by calcining to the indicated activities magnesium hydroxide precipitated from sea water by calcined dolomite, and the sand, silica flour and other additives as described in batch A. Batch D is made in the same manner as batch C except that, instead of 25% of the composite magnesia, there is added 22% of the same magnesia, and there is also added 3% of a seed mix prepared by gaging oxychloride grade magnesia with 20% $MgCl_2$ solution, without the addition of any silica, hardening and setting, crushing and powdering to pass a 100-mesh screen. In bath C, the initial setting time is 135 minutes and final set, 240 minutes; and in batch D, the initial set is 150 minutes and final set, 255 minutes. In batch C, the minimum contraction is $-0.125\%$ and in D, $-0.041\%$; the total change in C being $-0.126\%$ and in D, $-0.041\%$; and change from final set in C, $+0.015\%$ and in D, $+0.135\%$. The advantageous results of seed addition are more clearly shown in Figure 3.

In the third set of comparative tests, batch E is prepared by mixing 25% of a medium activity sea water magnesia (having an iodine number of about 12 to 13), obtained by calcining magnesium hydroxide precipitated from sea water by treatment thereof with calcined dolomite, with the sand, silica flour and other additives as described in batch A. Batch F is prepared in exactly the same manner as E except that, instead of 25.0% of the magnesia described, there is added 23.5% of the same magnesia, and there is also added 1.5% of a seed mix. This seed mix is prepared by gaging with 20% magnesium chloride solution a mixture of 12.5% oxychloride grade magnesia and 87.5% of silica passing a 200-mesh screen, hardening and setting, and grinding the hardened and set mass until substantially all passes 100 mesh. Figure 4 demonstrates graphically the improvement in volume stability and characteristics obtained with the seeded material over those exhibited by the unseeded cement. Furthermore, in batch E the initial setting time is 165 minutes and final setting time is 300 minutes, and in batch F the initial setting time is also 165 minutes, while final set is 285 minutes. In batch E, the minimum contraction is 0.074%, while in batch F, it is 0.028%, or only about one-third as great. In E, the total change is $-0.092\%$, and in F, $-0.029\%$; and in E, the change from final set to 24 hours is $+0.018\%$, and in F $+0.071\%$.

The cross-bending strengths found on tests made on Sorel cement compositions prepared according to the invention have been observed to be about 2000 lbs. per sq. in. at the age of 28 days.

The amount of water added in the gaging solution is chosen according to the usual good practice in this art. While the magnesium salt can be added dry and the tempering water added separately to the cement batch, it is better practice to add the water and salt together as a gaging solution.

It has been observed previously that setting time as a function of degree of burn can in a general way be correlated with surface activity as measured by iodine number. The iodine number herein referred to is determined by thoroughly agitating a weighted amount of the magnesia to be tested with a known amount of a 0.05 N solution of iodine dissolved in carbon tetrachloride, and then determining the amount of iodine which has been adsorbed upon the magnesia. A test of this sort is described in "Adsorption," by C. L. Mantell, on page 346 thereof. It has previously been found that the higher the iodine number, the more active the magnesia, and likewise the faster the magnesia will set.

In the specification and claims, the percentages are expressed by weight unless otherwise indicated. The screen sizes used herein are those of the U. S. Bureau of Standards and a 100-mesh screen, for example, is a screen having 100 meshes per linear inch. It is to be understood that the above examples and specific description are given as examples only of the present invention and that modifications and variations can be made therein without departing from the spirit and scope of the appended claims.

Having now described the invention, what is claimed is:

1. Process of preparing Sorel cement which comprises admixing magnesia, a tempering amount of water, at least one salt chosen from the group consisting of magnesium chloride and magnesium sulfate, and form about 0.5% to about 5.0% based on the total weight of dry ingredients of a previously prepared Sorel cement, said previously prepared Sorel cement having been gauged with a water solution of said same chosen salt.

2. Process of preparing Sorel cement which comprises admixing magnesia, inert aggregate, a gaging solution which is a water solution of at least one salt chosen from the group consisting of magnesium chloride and magnesium sulfate, and from about 0.5% to about 5.0%, based on the total weight of dry ingredients, of a previously prepared Sorel cement, said previously prepared Sorel cement having been gauged with a water solution of same said chosen salt.

3. Process of preparing Sorel cement which comprises admixing magnesia, obtained by treating a solution containing convertible magnesium salts with an alkaline agent to precipitate magnesium hydroxide and calcining said hydroxide, an inert aggregate, a gaging solution which is a water solution of at least one salt chosen from the group consisting of magnesium chloride and magnesium sulfate, and from about 0.5% to about 5.0%, based on the total weight of dry ingredients, of a finely divided Sorel cement, said finely divided Sorel cement having been gauged with a water solution of same said chosen salt.

4. Process as in claim 3 wherein the convertible magnesium salt solution is sea water.

5. Process as in claim 3 wherein the alkaline agent is chosen from the group consisting of lime and calcined dolomite.

6. Process of preparing magnesium oxychloride cement which comprises admixing magnesia having an average iodine number of from about 13 to about 17 and obtained by calcining at least one precipitated magnesium compound chosen from the group consisting of magnesium hydroxide, magnesium basic carbonate and magnesium carbonate, an inert aggregate, a water solution of magnesium chloride, and from about 0.5% to about 5.0%, based on the total weight of dry ingredients, of a finely divided magnesium oxychloride cement.

7. Process as in claim 6 wherein the finely divided magnesium oxychloride cement is obtained by admixing a water solution of magnesium chloride and a mixture of magnesia and from about 50% to about 90% of finely divided silica, based on the total weight of dry ingredients of said composition, allowing to harden, and powdering said hardened admixture.

8. Process as in claim 6 wherein the finely divided magnesium oxychloride cement is prepared by admixing magnesia and a water solution of magnesium chloride, and powdering the cement obtained.

9. Process of preparing Sorel cement which comprises admixing magnesia, inert aggregate, a gaging solution which is a water solution of at least one salt chosen from the group consisting of magnesium chloride and magnesium sulfate, and 1.25%, based on the total weight of dry ingredients, of a finely divided Sorel cement obtained by gaging with a water solution of said same chosen salt a mixture of 87.5% finely divided silica and 12.5% of magnesia.

10. Process of preparel Sorel cement which comprises admixing magnesia, inert aggregate, a gaging solution which is a water solution of at least one salt chosen from the group consisting of magnesium chloride and magnesium sulfate, and 3%, based on the total weight of dry ingredients, of finely divided magnesium oxychloride obtained by gaging magnesia with a water solution of said same chosen salt.

11. Process as in claim 10 wherein said first-named gaging solution is a water solution of a mixture of magnesium chloride and magnesium sulfate.

12. Process of preparing Sorel cement which comprises intimately admixing active magnesia, inert aggregate, a tempering amount of a 20% solution in water of a mixture of magnesium chloride and a minor amount of magnesium sulfate, and about 1.25%, based on the total weight of dry ingredients, of finely divided magnesium oxychloride cement obtained by gaging with a water solution of magnesium chloride a mixture of 87.5% finely divided silica and 12.5% finely divided magnesia, allowing to set and harden, and comminuting to pass a 100 mesh screen.

13. Process as in claim 12 wherein the active magnesia is obtained by calcining at least one precipitated compound chosen from the group consisting of magnesium hydroxide, magnesium carbonate and magnesium basic carbonate.

14. Process of preparing Sorel cement which comprises intimately admixing active magnesia, inert aggregate, a tempering amount of a 20% solution in water of a mixture of magnesium chloride and a minor amount of magnesium sulfate, and about 3.0%, based on the total weight of dry ingredients, of finely divided magnesium oxychloride cement obtained by gaging an active magnesia with a water solution of magnesium chloride, allowing to set and harden, and comminuting to pass a 100 mesh screen.

15. Process as in claim 14 wherein the active magnesia is obtained by calcining at least one precipitated compound chosen from the group consisting of magnesium hydroxide, magnesium carbonate and magnesium basic carbonate.

16. Sorel cement-forming composition, characterized by increased volume stability upon setting, comprising magnesia and from about 0.5% to about 5.0%, based on the total weight of dry ingredients, of finely divided Sorel cement.

17. Magnesium oxychloride cement-forming composition characterized by increased volume stability upon setting comprising magnesia, inert aggregate and from about 0.5% to about 5.0%, based on the total weight of dry ingredients, of finely divided magnesium oxychloride Sorel cement.

18. A cementitious composition of superior volume stability comprising Sorel cement prepared by admixing magnesia, a water solution of about 90% of magnesium chloride and about 10% of magnesium sulfate, and from about 0.5% to about 5.0%, based on the total weight of dry ingredients, of finely divided magnesium oxychloride Sorel cement.

19. A cementitious composition of superior volume stability comprising Sorel cement prepared by admixing magnesia, a water solution of at least one salt chosen from the group consisting of magnesium chloride and magnesium sulfate, and from about 0.5% to about 5.0%, based on the total weight of dry ingredients, of a finely divided Sorel cement containing the same magnesium oxysalt composition.

ALVA C. BYRNS.

No references cited.